United States Patent [19]

Terao et al.

[11] Patent Number: 5,614,778

[45] Date of Patent: Mar. 25, 1997

[54] SERVO CYLINDER APPARATUS

[75] Inventors: Yukio Terao; Hiromichi Kajikawa; Kaoru Suzuki, all of Ibaraki-ken, Japan

[73] Assignee: SMC Kabushiki Kaisha, Tokyo, Japan

[21] Appl. No.: 321,626

[22] Filed: Oct. 12, 1994

[30] Foreign Application Priority Data

| Oct. 12, 1993 | [JP] | Japan | 5-254453 |
| Oct. 12, 1993 | [JP] | Japan | 5-254468 |
| Oct. 12, 1993 | [JP] | Japan | 5-254470 |
| Oct. 12, 1993 | [JP] | Japan | 5-254480 |

[51] Int. Cl.$^6$ .................................................. H02K 7/06
[52] U.S. Cl. ........................ 310/80; 310/77; 310/15; 74/625; 60/545; 91/44; 91/59
[58] Field of Search ................ 310/80; 91/44, 91/59; 60/545; 74/625; 114/150; 414/589

[56] References Cited

U.S. PATENT DOCUMENTS

| 3,251,249 | 5/1966 | Carlstedt | 74/3 |
| 3,628,397 | 12/1971 | Sheesley | 74/625 |
| 4,088,087 | 5/1978 | Nitta | 114/150 |
| 4,137,784 | 2/1979 | Griffin | 74/89 |
| 4,444,540 | 4/1984 | Blatt et al. | 414/589 |
| 4,449,442 | 5/1984 | Ebbing et al. | 91/44 |
| 4,509,904 | 4/1985 | MacAskill et al. | 417/658 |
| 4,517,853 | 5/1985 | Tani et al. | 74/89.15 |
| 4,918,921 | 4/1990 | Leigh-Monstevens et al. | 60/545 |
| 5,105,719 | 4/1992 | Yoshikawa | 91/59 |
| 5,193,408 | 3/1993 | Fukui et al. | 74/89.15 |
| 5,261,810 | 11/1993 | Kamp et al. | 425/451 |
| 5,310,138 | 5/1994 | Fitzgibbon | 244/49 |
| 5,322,430 | 6/1994 | Kasai et al. | 425/3 |
| 5,326,257 | 8/1993 | Monzaki et al. | 303/114.1 |

FOREIGN PATENT DOCUMENTS

| 0225276 | 6/1987 | European Pat. Off. . |
| 3620969 | 1/1987 | Germany . |
| 50-15187 | 2/1975 | Japan . |
| 60-32456 | 9/1985 | Japan . |
| 4-45687 | 7/1992 | Japan . |
| 2159638 | 12/1985 | United Kingdom . |

OTHER PUBLICATIONS

Patent Abstracts of Japan, vol. 10, No. 105 (M–471)(2162), Apr. 19, 1986, JP-A-60 237 202, Nov. 26, 1985.
Patent Abstracts of Japan, vol. 15, No. 190 (M–113), May 16, 1991, JP-A-03 048 002, Mar. 1, 1991.
Patent Abstracts of Japan, vol. 9, No. 191 (M–402)(1914), Aug. 7, 1985, JP-A-60 057 001, Apr. 2, 1985.
Patent Abstracts of Japan, vol. 14, No. 101 (P–1012)(4044), Feb. 23, 1990, JP-A-01 305 405, Dec. 8, 1989.

*Primary Examiner*—Thomas M. Dougherty
*Assistant Examiner*—Elvin G. Enad
*Attorney, Agent, or Firm*—Oblon, Spivak, McClelland, Maier & Neustadt, P.C.

[57] ABSTRACT

Compressed air is introduced into a cylinder chamber to displace a piston closely to a target position. Then, a ball screw shaft is rotated about its own axis by an electric motor to inch the piston to the target position. Upon arrival of the piston at the target position, the ball screw shaft is stopped by a brake mechanism to hold the piston accurately in the target position. The drive shaft of the electric motor extends parallel to the ball screw shaft, thus reducing the entire length of a servo cylinder apparatus. Solenoid-operated directional control valves, for supplying compressed air to the cylinder chamber and the brake mechanism are coupled integrally to a cylinder assembly, so that pipes are shortened for allowing the piston to be displaced and stopped quickly and accurately.

12 Claims, 10 Drawing Sheets

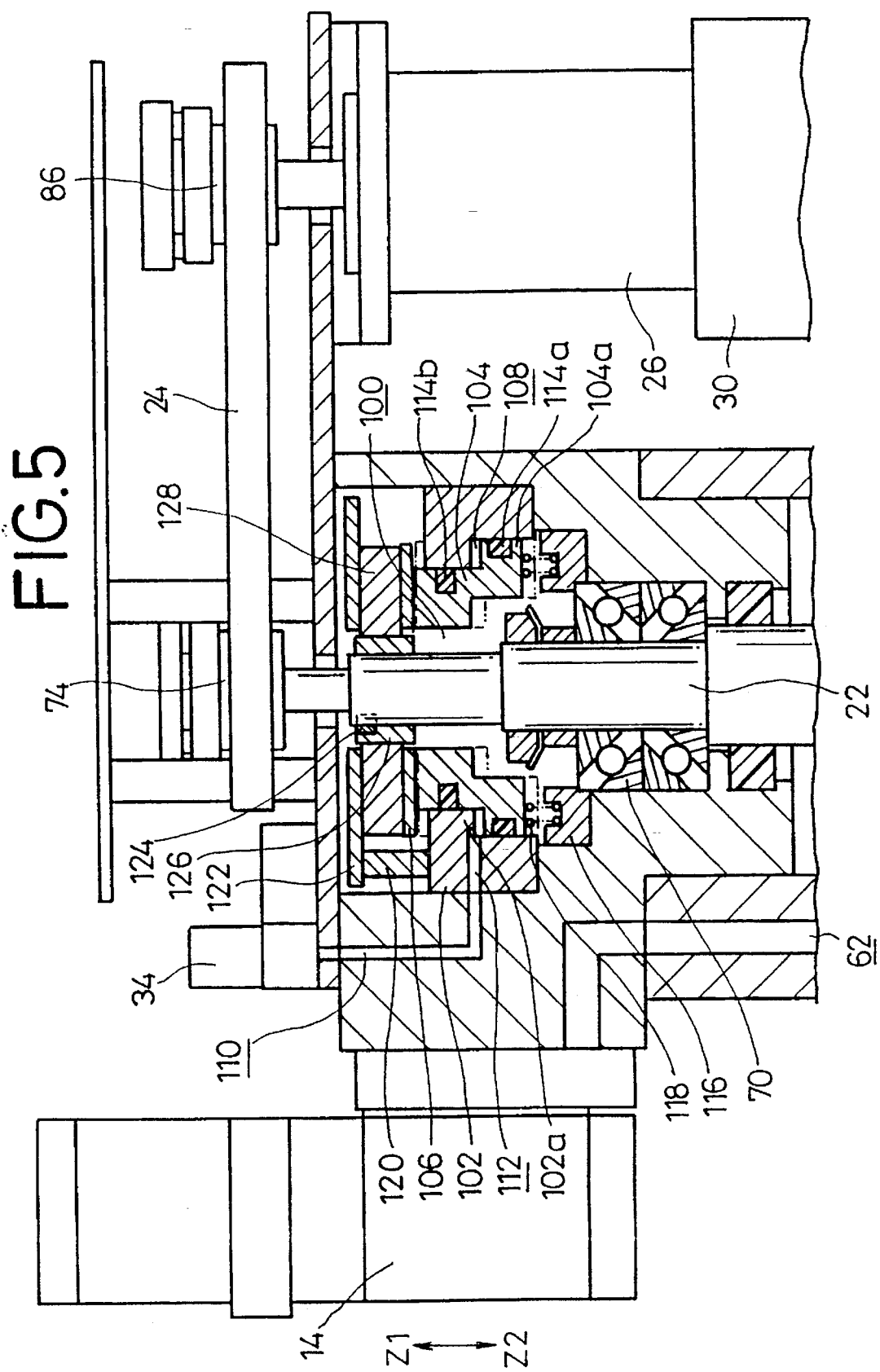

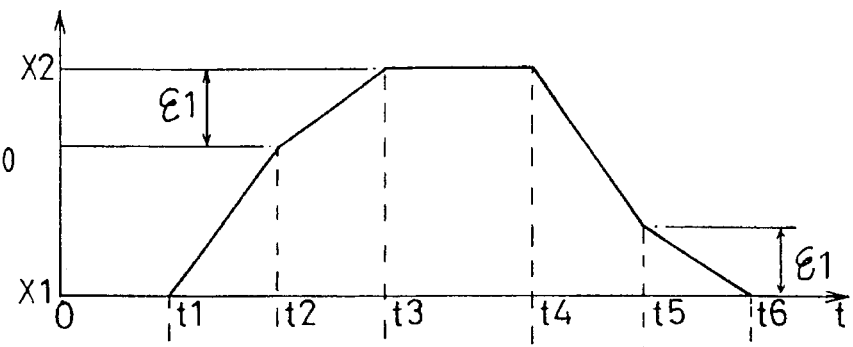
FIG.6A POSITION OF PISTON 20
FIG.6B SET PRESSURE OF ELECTRO-PNEUMATIC REGULATOR
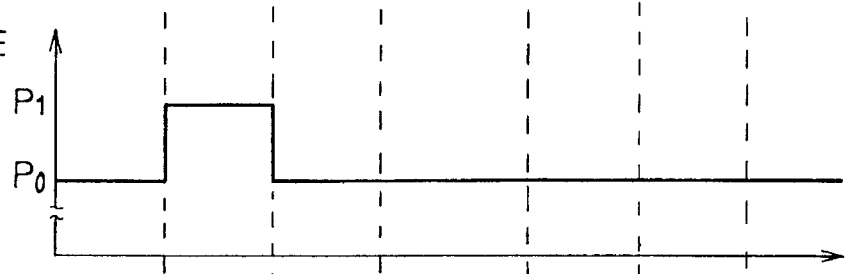
FIG.6C SOLENOID-OPERATED DIRECTIONAL CONTROL VALVE 14
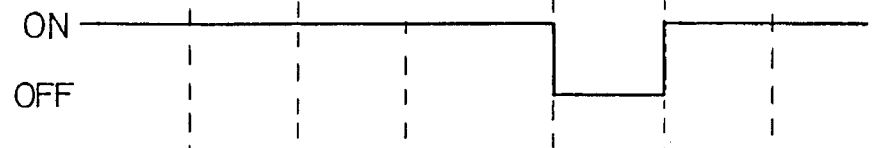
FIG.6D PRESSURE IN 1ST CHAMBER 64a
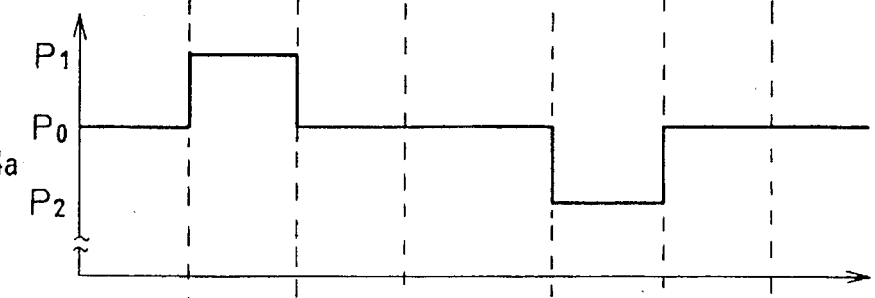
FIG.6E MOTOR 26
FIG.6F SOLENOID-OPERATED DIRECTIONAL CONTROL VALVE 34
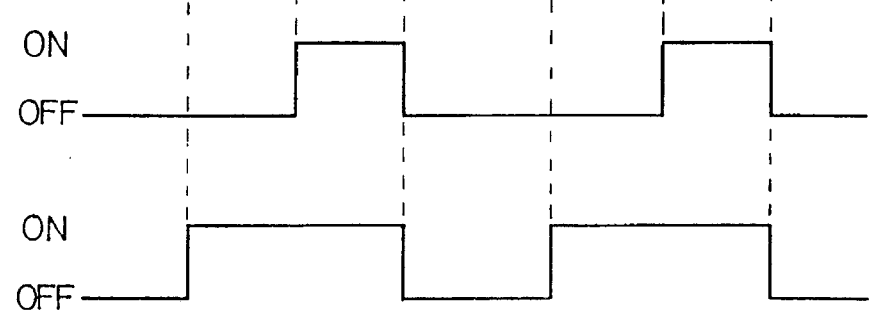

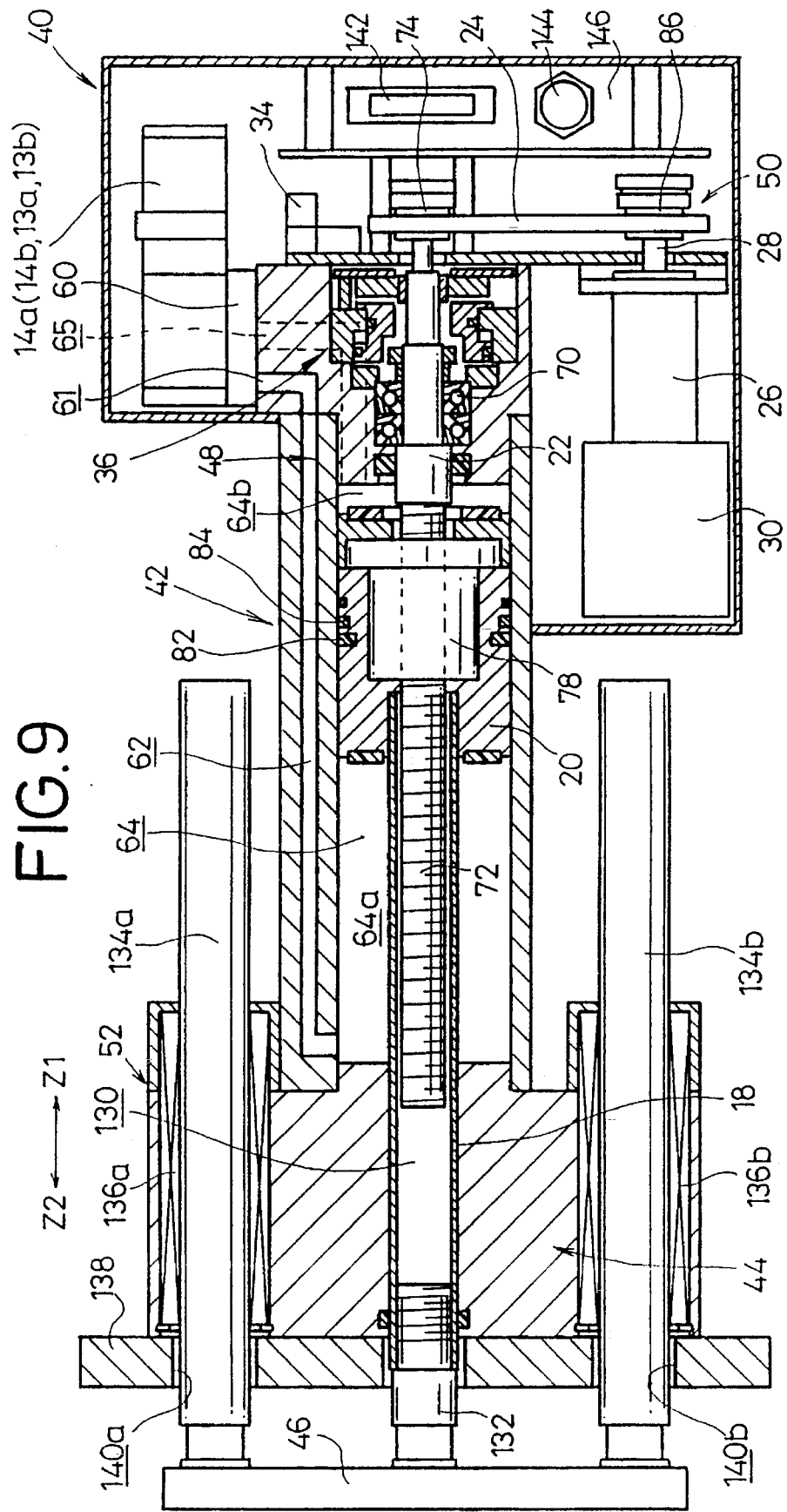

FIG.10A
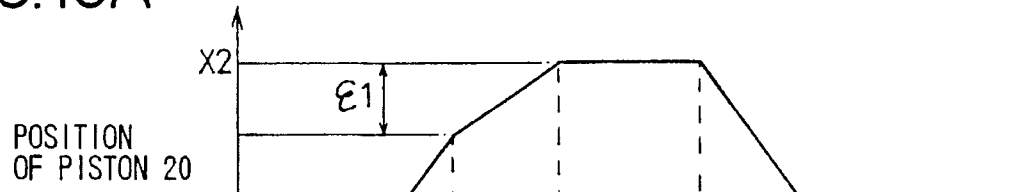
POSITION OF PISTON 20
FIG.10B
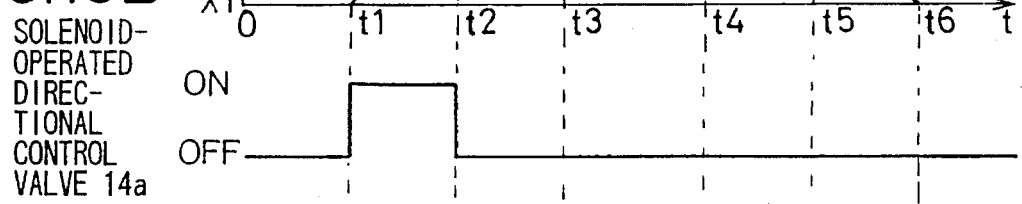
SOLENOID-OPERATED DIRECTIONAL CONTROL VALVE 14a
SOLENOID-OPERATED DIRECTIONAL CONTROL VALVE 14b
FIG.10C
FIG.10D
PRESSURE IN 1ST CHAMBER 64a
FIG.10E
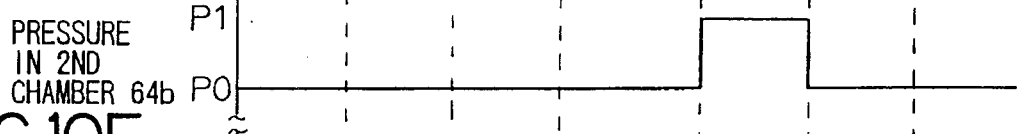
PRESSURE IN 2ND CHAMBER 64b
FIG.10F
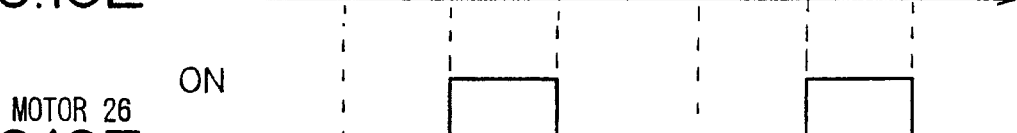
MOTOR 26
FIG.10G
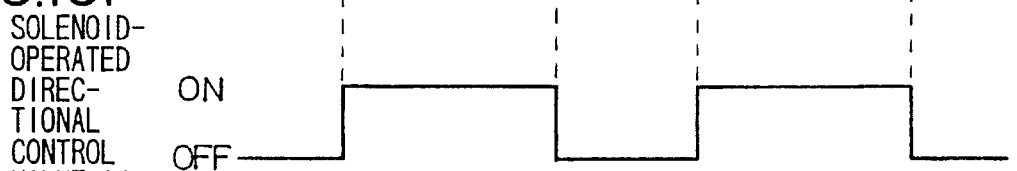
SOLENOID-OPERATED DIRECTIONAL CONTROL VALVE 34

5,614,778

SERVO CYLINDER APPARATUS

BACKGROUND OF THE INVENTION

1. Field of the Invention

The present invention relates to a cylinder for stopping a piston accurately in a desired position with a small-size motor by displacing the piston with a fluid under pressure and the motor, and more particularly to a servo cylinder apparatus in which a valve is integrally mounted on such a cylinder for accurately controlling the piston.

2. Description of the Related Art

There have heretofore been known actuators for displacing a workpiece on a table that is fixed to the distal end of the piston rod of a cylinder. One actuator structure has a piston rod coupled to a piston which is housed in a cylinder chamber for axial displacement therein under a pneumatic pressure. According to another actuator design, a piston rod is connected to a ball screw which is rotated by an electric motor or the like for displacing the piston rod.

The former actuator structure is capable of displacing a heavy workpiece as it can produces large output power. However, since the air is a compressible fluid, it is difficult to position the workpiece accurately.

The latter actuator design can stop a workpiece in an accurate position as the electric motor is electrically controlled. However, if a heavy workpiece is to be conveyed and positioned, then it is necessary to employ an electric motor capable of generating large output power, and such an electric motor is necessarily large in size.

In view of the above conventional actuator drawbacks, there has been proposed a hybrid actuator system which has a cylinder for conveying a workpiece under pneumatic pressure to a zone near a position in which the workpiece is to be stopped, and an electric motor for moving the workpiece from the zone and stopping it accurately in the position. Since the electric motor which is used may be small in size, the proposed hybrid actuator system may also be small in size. The proposed hybrid actuator system is also advantageous in that it can stop the workpiece accurately in a desired position.

The proposed hybrid actuator system has a solenoid-operated directional control valve disposed in fluid passages for supplying and discharging the pneumatic pressure to and from the cylinder. If a brake mechanism for stopping the workpiece is operated also under pneumatic pressure, then the brake mechanism is associated with a solenoid-operated directional control valve. As the distance between the cylinder and its solenoid-operated directional control valve or the distance between the brake mechanism and its solenoid-operated directional control valve increases, the time required for a pneumatic pressure action from the solenoid-operated directional control valve to reach the cylinder or the brake mechanism also increases. The increased distance results in an excessively long response time of the cylinder or the brake mechanism. If the brake mechanism has a long response time, then it takes a relatively long period of time for the piston to be braked and tends to lower the accuracy with which the piston is stopped by the brake mechanism. Another difficulty is that a piping system connected between the cylinder, the brake mechanism, and their solenoid-operated directional control valves is complex.

In the case where the piston of the actuator system is directed vertically, the workpiece conveyed by the actuator is likely to drop abruptly in the event of an electric power failure or a fluid pressure supply failure.

In the actuator system, the electric motor is directly coupled to the ball screw. The piston rod connected to the piston rod, the ball screw, and the drive shaft of the electric motor are thus connected in series with each other. Such a series-connected shaft arrangement is disadvantageous in that the actuator system has too a long of an axial dimension under some installing conditions.

SUMMARY OF THE INVENTION

It is therefore an object of the present invention to provide a servo cylinder apparatus having relatively short pipes interconnecting solenoid-operated directional control valves and a cylinder and a brake mechanism, resulting in a simplified piping arrangement, for shortening response times of the cylinder and the brake mechanism.

Another object of the present invention is to provide a servo cylinder apparatus which has a relatively simple brake mechanism capable of holding a workpiece in an original position even in the event of an electric power failure or a fluid pressure supply failure.

Still another object of the present invention is to provide a servo cylinder apparatus which has a limited axial dimension and is capable of positioning a workpiece highly accurately.

To achieve the above objects, there is provided in accordance with the present invention a servo cylinder apparatus having a piston displaceably disposed in a cylinder chamber defined in a cylinder assembly, a piston rod having an end fixed to the piston and an opposite end exposed out of the cylinder chamber, pressure supply means for supplying a fluid pressure to the cylinder chamber, a ball screw shaft engaging the piston, an electric motor coupled to the ball screw shaft, and brake means for braking the ball screw shaft against rotation to hold the piston in a predetermined position, the arrangement being such that the piston is displaced closely to a target position under a fluid pressure supplied to the cylinder chamber, thereafter the ball screw shaft is rotated by the electric motor to inch the piston toward the target position, and when the piston reaches the target position, the ball screw shaft is braked against rotation by the brake means to stop the piston in the target position, characterized in that the electric motor has a drive shaft extending parallel to the ball screw shaft, and characterized by first rotating means coupled to an end of the ball screw shaft, second rotating means coupled to the drive shaft, and rotation transmitting means connected between the first and second rotating means.

The first and second rotating means may comprise pulleys, respectively, and the rotating transmitting means may comprise a timing belt trained around the pulleys.

The brake means may comprise a brake mechanism for releasing the ball screw shaft in response to the application of a fluid pressure thereto and braking the ball screw shaft in response to removal of a fluid pressure therefrom, and a normally closed solenoid-operated directional control valve for connecting a fluid pressure supply to the brake mechanism to apply the fluid pressure thereto in response to an actuating signal and removing the fluid pressure from the brake mechanism in response to an inactivating signal, the normally closed solenoid-operated directional control valve being mounted integrally on the cylinder assembly.

The brake mechanism may comprise a disk disposed around the ball screw shaft, a brake cylinder disposed around the ball screw shaft, a brake piston disposed around the ball screw shaft for being displaced in the brake cylinder under the fluid pressure supplied thereto, and a resilient member for normally biasing the brake piston to be pressed against the disk, the arrangement being such that the brake piston can be spaced from the disk against the bias of the resilient member when the fluid pressure is supplied from the normally closed solenoid-operated directional control valve to the brake cylinder.

The pressure supply means may comprise a solenoid-operated directional control valve for supplying a fluid pressure to a rod-side chamber of the cylinder chamber, and a fluid passage interconnecting the rod-side chamber and the solenoid-operated directional control valve.

The pressure supply means may also comprise a solenoid-operated directional control valve for supplying a fluid pressure to a head-side chamber of the cylinder chamber remote from the piston rod, and a fluid passage interconnecting the head-side chamber and the solenoid-operated directional control valve.

Alternatively, the pressure supply means may comprise a first solenoid-operated directional control valve for supplying a fluid pressure to a rod-side chamber of the cylinder chamber, a first fluid passage interconnecting the rod-side chamber and the first solenoid-operated directional control valve, a second solenoid-operated directional control valve for supplying a fluid pressure to a head-side chamber of the cylinder chamber remote from the rod-side chamber, and a second fluid passage interconnecting the head-side chamber and the second solenoid-operated directional control valve, the first and second solenoid-operated directional control valves being mounted integrally in substantially the same position on the cylinder assembly.

The first and second fluid passages may have substantially the same effective cross-sectional area.

The cylinder assembly may have a rod cover disposed outside of a rod-side chamber of the cylinder chamber and a head cover disposed outside of a head-side chamber of the cylinder chamber remote from the rod-side chamber, the pressure supply means being integrally mounted in the rod cover or the head cover.

Alternatively, the cylinder assembly may have a rod cover disposed outside of the rod-side chamber, the solenoid-operated directional control valve for supplying a fluid pressure to the rod-side chamber being integrally mounted in the rod cover.

Alternatively, the cylinder assembly has a head cover disposed outside of the head-side chamber, the solenoid-operated directional control valve for supplying a fluid pressure to the head-side chamber being integrally mounted in the head cover.

Alternatively, the cylinder assembly may have a head cover disposed outside of the head-side chamber and a rod cover disposed outside of the rod-side chamber, the brake means and the second solenoid-operated directional control valve being disposed in the head cover, the first solenoid-operated directional control valve being disposed in the rod cover.

With the above arrangement, the drive shaft of the electric motor extends parallel to the ball screw shaft, and the first and second rotating means are coupled to respective ends of the ball screw shaft and the drive shaft, and the rotation transmitting means is connected between the first and second rotating means for transmitting drive forces from the electric motor through the ball screw shaft to the piston. Since the electric motor is not positioned at the end of the ball screw shaft, the axial dimension of the servo cylinder apparatus is reduced.

The normally closed solenoid-operated directional control valve for supplying the fluid pressure to the brake mechanism is mounted integrally on the cylinder assembly. Therefore, a fluid passage extending from the normally closed solenoid-operated directional control valve to the brake mechanism is shortened to improve the response time of the brake mechanism with respect to a control signal. The piston can thus be stopped in a desired position highly accurately by the brake mechanism with the improved response time.

The brake mechanism brakes the piston upon a reduction in the fluid pressure supplied from the normally closed solenoid-operated directional control valve. When the supply of the fluid pressure is interrupted due to a fluid pressure supply failure or upon a power supply failure, the brake mechanism is actuated to brake the piston. Even if the servo cylinder apparatus is oriented vertically to convey a workpiece vertically, the workpiece is prevented from being accidentally falling upon a fluid pressure supply failure or a power supply failure.

The first and second solenoid-operated directional control valves are mounted integrally in substantially the same position on the cylinder assembly, and the first fluid passage interconnecting the rod-side cylinder and the first solenoid-operated directional control valve and the second fluid passage interconnecting the head-side cylinder and the second solenoid-operated directional control valve are disposed in the cylinder assembly. Therefore, pipes extending from the first and second solenoid-operated directional control valves to the fluid pressure supply are shortened and simplified.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is an enlarged fragmentary cross-sectional view of a disk brake mechanism and associated parts of the cylinder assembly of the servo cylinder apparatus according to the first embodiment;

FIGS. 6(a)–6(f) are timing charts of an operation sesquence of the servo cylinder apparatus according to the first embodiment;

FIG. 9 is a partly cross-sectional view of a cylinder assembly of the servo cylinder apparatus according to the third embodiment; and:

FIGS. 10(a)–10(g) are timing charts of an operation sequence of the servo cylinder apparatus according to the third embodiment.

DETAILED DESCRIPTION OF THE PREFERRED EMBODIMENTS (1st Embodiment)

Figure 1:
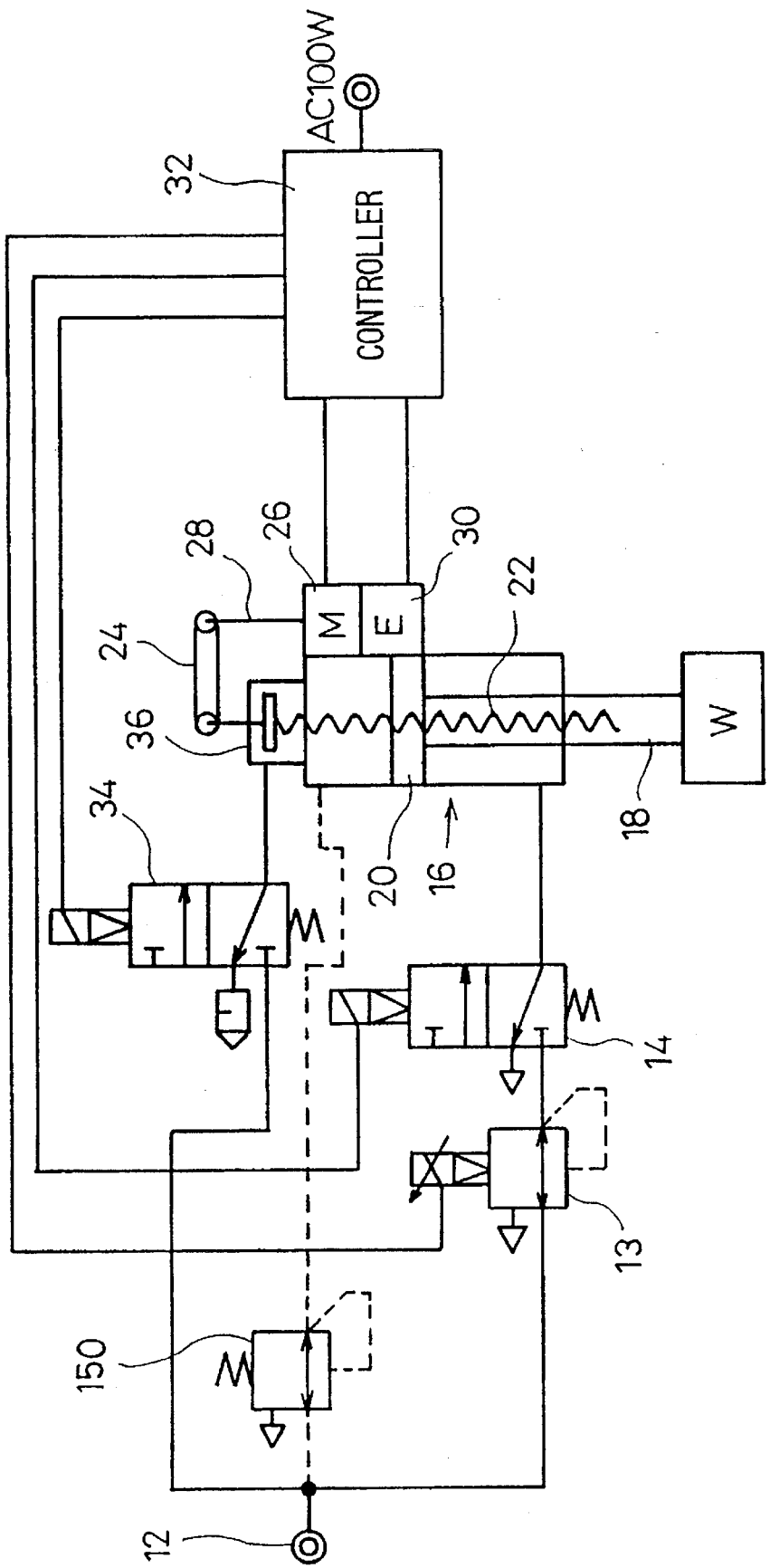
FIG. 1 is a circuit diagram of a fluid pressure circuit arrangement of a servo cylinder apparatus according to a first embodiment of the present invention.

FIG. 1 shows a servo cylinder apparatus 10 according to a first embodiment of the present invention. As shown in FIG. 1, compressed air from a compressed air supply 12 is supplied through an electropneumatic regulator 13 in the form of a solenoid-operated directional control valve and a normally closed solenoid-operated directional control valve 14 to a cylinder assembly 16, or, alternatively, compressed air from the cylinder assembly 16 is discharged into the atmosphere through the normally closed solenoid-operated directional control valve 14, for thereby vertically displacing a piston 20 that is connected to a piston rod 18 which supports a workpiece W. Upon vertical movement of the piston 20, a ball screw shaft 22 engaging the piston 20 is rotated. The rotation of the ball screw shaft 22 is transmitted through a timing belt 24 and a drive shaft 28 of an electric motor 26 to an encoder 30, which produces an output signal representing the axial displacement of the piston 20. When the piston 20 reaches a certain position, a controller 32 transmits a signal for changing a pressure setting of the electropneumatic regulator 13 to a pressure for bearing only the static load of the workpiece W, and also transmits a drive signal to the electric motor 26. As a result, the electric motor 26 is energized to rotate the ball screw shaft 22 for thereby displacing the piston 20. When the controller 32 confirms that the piston 20 has reached a desired position based on the output signal from the encoder 30, the controller 32 produces a signal to actuate a normally closed solenoid-operated directional control valve 34, which actuates a disk brake mechanism 36 to stop the piston 20.

The cylinder assembly 16 of the servo cylinder apparatus 10 will be described in detail below.

Figure 2:
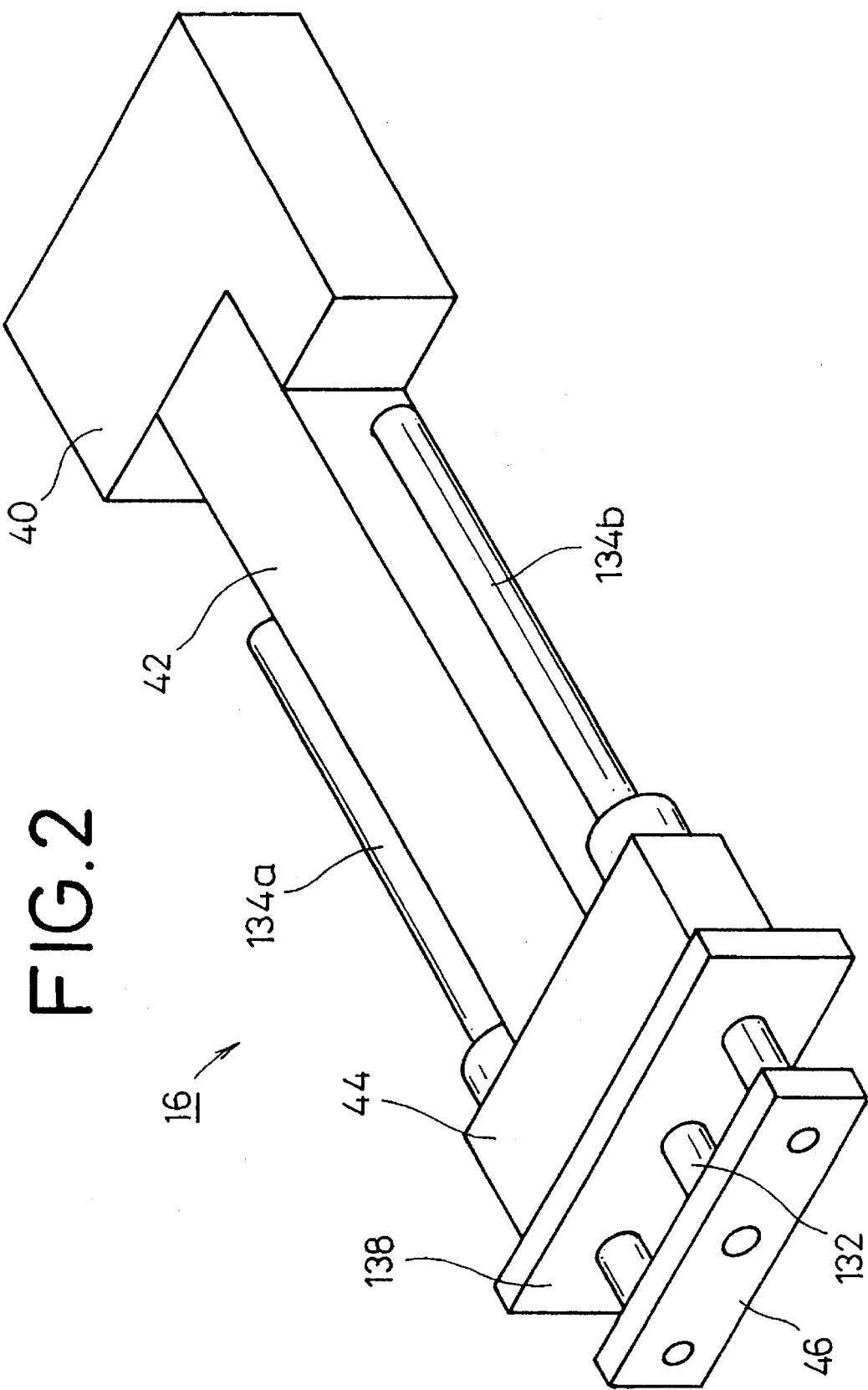
FIG. 2 is a perspective view of a cylinder assembly of the servo cylinder apparatus according to the first embodiment.
Figure 3:
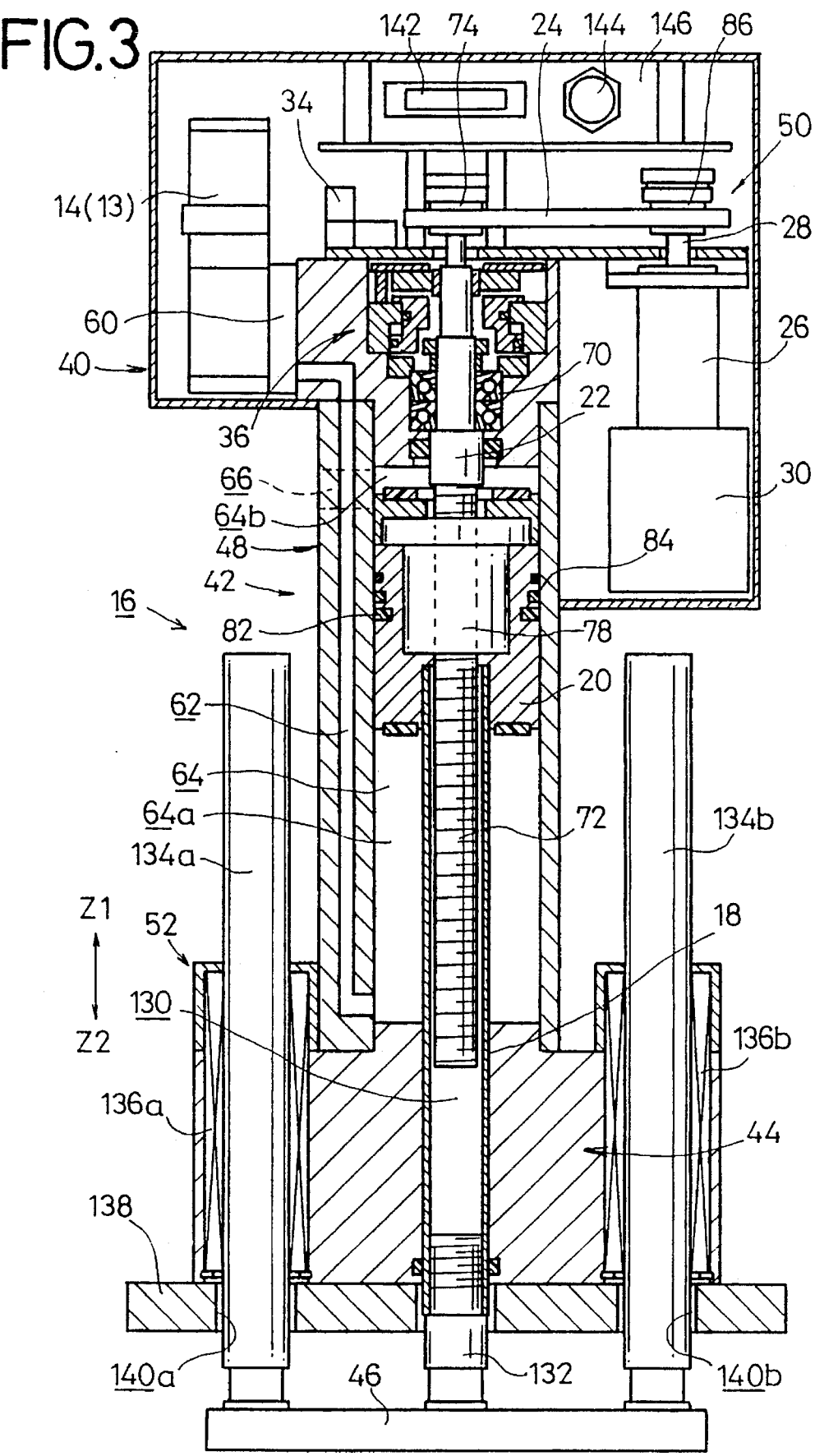
FIG. 3 is a partly cross-sectional view of the cylinder assembly of the servo cylinder apparatus according to the first embodiment.

As shown in FIG. 2, the cylinder assembly 16 is combined with a head cover 40, a cylinder tube 42, a rod cover 44, and a table 46 which engages the workpiece W. As shown in FIG. 3, the cylinder assembly 16 has a pneumatic pressure supply mechanism 48 for supplying air into the cylinder tube 42, a ball screw shaft rotating mechanism 50 for rotating the ball screw shaft 22, a disk brake mechanism 36 for braking the ball screw shaft 22 to stop the piston 20, and a holding mechanism 52 for holding the table 46 against rotation.

The pneumatic pressure supply mechanism 48 includes the electropneumatic regulator 13 which communicates with the compressed air supply 12 and the normally closed solenoid-operated directional control valve 14 to which communicates with the electropneumatic regulator 13, the electropneumatic regulator 13 and the solenoid-operated directional control valve 14 being housed in the head cover 40. The cylinder tube 42 has a cylinder chamber 64 defined therein which is divided by the piston 20 into a first chamber 64a on the side of the rod cover 44 and a second chamber 64b on the side of the head cover 40. The solenoid-operated directional control valve 14 is held in communication with the first chamber 64a of the cylinder chamber 64 close to the rod cover 44 through a joint plate 60 and a passage 62 defined in the cylinder tube 42. The cylinder tube 42 has a passage 66 communicating with the second chamber 64b close to the head cover 40, the passage 66 being vented to the atmosphere.

Figure 4:
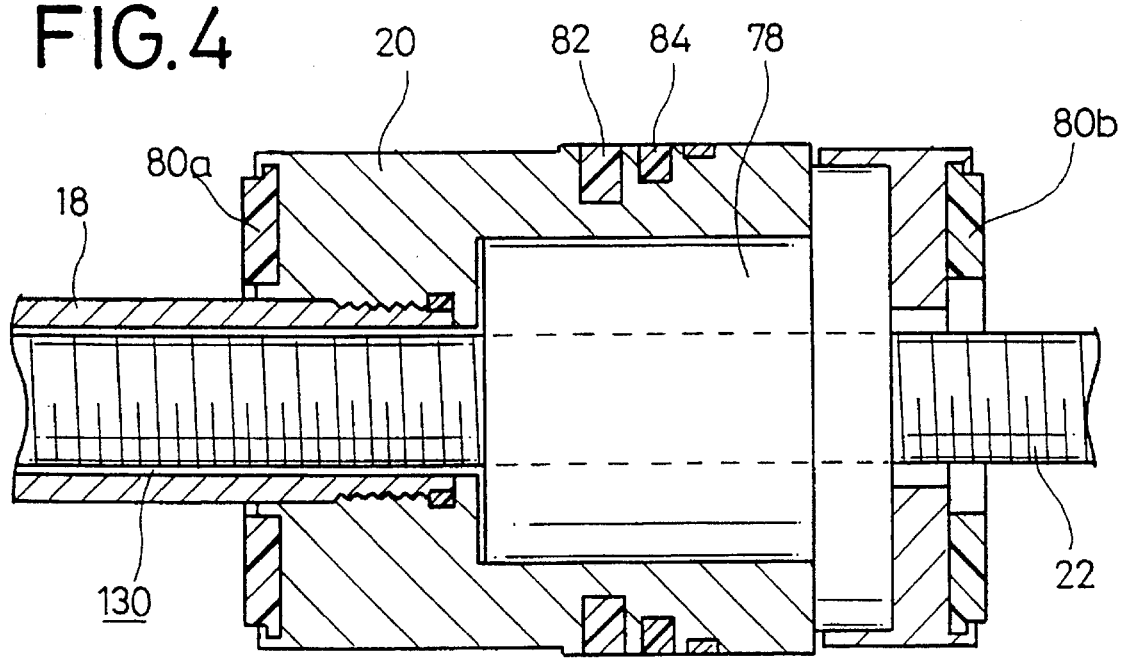
FIG. 4 is an enlarged fragmentary cross-sectional view of a piston and associated parts of the cylinder assembly of the servo cylinder apparatus according to the first embodiment.

In the ball screw shaft rotating mechanism 50, as shown in FIG. 3, the ball screw shaft 22 is rotatably, and axially movably, supported in the head cover 40 by an angular ball bearing 70. The ball screw shaft 22 has a screw thread 72 defined on an outer surface thereof which is housed in the cylinder chamber 64. The ball screw shaft 22 has a larger-diameter portion and a plurality of successive smaller-diameter portions which are positioned in the head cover 40, with a pulley 74 being mounted on a smallest-diameter end thereof. The ball screw shaft 22 is held in engagement with a body 78 fitted in the piston 20 through balls (not shown). As shown in FIG. 4, dampers 80a, 80b are mounted on respective axially opposite ends of the piston 20 which face the rod cover 44 and the head cover 40, respectively, and a magnet 82 and a piston packing 84 are fitted in respective grooves defined in an outer circumferential surface of the piston 20 which is held in slidable contact with the inner circumferential surface of the cylinder chamber 64. The magnet 82 is used in combination with a sensor positioned on an outer circumferential surface of the cylinder tube 42 for detecting a positional error of the piston 20.

The head cover 40 houses the electric motor 26 parallel to the ball screw shaft 22 and a pulley 86 mounted on the end of the drive shaft 28 of the electric motor 26. The encoder 30 for detecting the angular position of the drive shaft 28 is mounted on the electric motor 26 and coupled to the drive shaft 28 thereof. A timing belt 24 is trained around the pulleys 74, 86.

As shown in FIG. 5, the disk brake mechanism 36 comprises components disposed in a hole 100 that is defined in the head cover 40 in which the angular ball bearing 70 is disposed. The hole 100 has first and second portions which are successively smaller in diameter from the pulley 74 toward the angular ball bearing 70. The disk brake mechanism 36 has a brake cylinder 102 of radial L-shaped cross section fixedly mounted on the bottom of the first portion of the hole 100 and having a radially inward portion 102a extending toward the ball screw shaft 22, and a piston 104 of radial substantially L-shaped cross section slidably held against an inner circumferential surface of the brake cylinder 102 and having a radially outward portion 104a extending away from the ball screw shaft 22. The radially inward portion 102a of the brake cylinder 102 is axially disposed between the radially outward portion 104a of the piston 104 and a brake member 106 fixed to an axial end of the piston 104 which faces toward the pulley 74. The radially outward portion 104a or the brake member 106 can be brought into abutment against the radially inward portion 102a of the brake cylinder 102 for thereby limiting the axial movement of the piston 104. A space 108 is defined between the piston 104 and the brake cylinder 102, and hermetically sealed by piston packings 114a, 114b that are fitted in respective grooves defined in an outer circumferential surface of the piston 104 which is slidably held against the inner circumferential surface of the brake cylinder 102. The normally closed solenoid-operated directional control valve 34 which communicates with the compressed air supply 12 is held in communication with the space 108 through passages 110, 112 which are defined respectively in the head cover 40 and the brake cylinder 102. A bearing holder 116 is fixedly mounted on the bottom of the second portion of the hole 100. The spring 104 is normally urged to move toward the pulley 74, i.e., in the direction indicated by the arrow Z1 by a coil spring 118 which is disposed axially between the bearing holder 116 and the piston 104.

Another doughnut-shaped disk brake member 122 is axially supported on the brake cylinder 102 by a support member 120. A brake disk 128 is mounted on the ball screw shaft 22 near its end on which the pulley 74 is mounted, through a sleeve key 124 and a sleeve 126 disposed around the ball screw shaft 22. The brake disk 128 is rotatable adjacent to the brake member 122, and the brake member 106 is positioned adjacent to the brake disk 128.

As shown in FIG. 3, the holding mechanism 52 serves to prevent the table 46 which can axially be displaced by the piston rod 18 from rotating with the piston rod 18.

The piston rod 18 is in the form of a hollow cylinder and has an end threaded in an end portion of the piston 20 which faces the rod cover 44. The piston rod 18 has an inner hole 130 housing the ball screw shaft 22 coaxially therein which is held out of contact with an inner wall surface of the hole 130. A shaft member 132 is threaded in an end of the piston rod 18 near the rod cover 44, and fixed to the table 46 by a bolt or the like (not shown). Guide rods 134a, 134b are fixed respectively to opposite ends of the table 46 by bolts (not shown). The guide rods 134a, 134b are axially slidably supported by respective ball bushings 136a, 136b mounted on opposite sides of the rod cover 44, and inserted respectively through holes 140a, 140b defined in a flange 138 that is mounted on an end of the rod cover 44.

The head cover 40 houses a terminal base 146 supporting terminals 142, 144 for being supplied with control and power supply signals from the controller 32.

Operation of the servo cylinder apparatus 10 for displacing the workpiece W upwardly, i.e., for displacing the piston 20 from a position X1 to a position X2 (see FIGS. 6(a)–6(f) in the cylinder chamber 64, will be described below with reference to FIGS. 6(a)–6(f).

When the piston 20 is stopped in the position X1 (from a time t0 to a time t1), the electropneumatic regulator 13 is set to a pressure P0 for supporting a static load of the workpiece W, the piston rod 18, and the piston 20, and the solenoid-operated directional control valve 14 is actuated and the solenoid-operated directional control valve 34 is inactivated. As a result, the pressure P0 is developed in the first chamber 64a for thereby reliably supporting the workpiece W and the piston 20. Since the space 108 in the disk brake mechanism 36 is vented to the atmosphere through the solenoid-operated directional control valve 34, the piston 104 is displaced in the direction Z1 under the resiliency of the coil spring 118, pressing the brake member 106 against the brake disk 128. The brake disk 128 is now gripped between the brake members 106, 122, locking the ball screw shaft 22 against rotation thereby to stop the piston 20.

To displace the piston 20 toward the position X2, the controller 32 supplies the electropneumatic regulator 13 with a signal to switch from the pressure P0 to a pressure P1 (P1>P0), and also transmits a signal to actuate the solenoid-operated directional control valve 34. As a result, the compressed air supply 12 is brought into communication with the space 108 in the disk brake mechanism 36, supplying compressed air into the space 108. The piston 104 is now displaced in the direction indicated by the arrow Z2 as indicated by the two-dot-and-dash lines in FIG. 5 against the bias of the coil spring 118. The brake member 106 is spaced away from the disk brake 128, so that the disk brake mechanism 36 is inactivated. The piston 20 is now displaceable in the cylinder chamber 64. Compressed air under the pressure P1 is introduced from the electropneumatic regulator 13 through the solenoid-operated directional control valve 14 into the first chamber 64a, for thereby displacing the piston 20 in the direction Z1.

At this time, since the ball screw shaft 22 and the body 78 are held in engagement with each other through the balls, the piston 20 is subjected to a moment, i.e., tends to rotate about the ball screw shaft 22. However, the piston 20 is actually not rotated because the guide rods 134a, 134b mounted on the table 46 which is connected to the piston 20 through the piston rod 18 are inserted through the respective holes 140a, 140b. Therefore, when the piston 20 is axially displaced, the ball screw shaft 22 is rotated about its own axis. The rotation of the ball screw shaft 22 is transmitted to the drive shaft 28 of the motor 26 through the pulley 74 on the end of the ball screw shaft 22 close to the head cover 40, the timing belt 24, and the pulley 36. As a consequence, the angular displacement of the drive shaft 28 is detected by the encoder 30 and hence the controller 32 as the axial displacement of the piston 20.

When the controller 32 detects, at a time t2, the arrival of the piston 20 at a switching position that is spaced a distance e1 from the position X2 in which the piston 20 is to be stopped, the controller 32 supplies the electropneumatic regulator 13 with a signal to switch from the pressure P1 to the pressure P0, and also transmits a signal to energize the electric motor 26. As a result, the pressure P0 acts in the first chamber 64a, supporting only a static load of the piston 20 and the workpiece W. Since the electric motor 26 is energized, however, the piston 20 is displaced the distance e1 at a low speed through the pulley 86, the timing belt 24, the pulley 74, and the ball screw shaft 22.

Upon arrival, at a time t3, of the piston 20 at the position X2 as detected by the encoder 30 and hence the controller 32, the controller 32 transmits signals to de-energize both the electric motor 26 and the solenoid-operated directional control valve 34.

The compressed air in the space 108 is now discharged through the passages 112, 110 and the solenoid-operated directional control valve 34 into the atmosphere. Therefore, the piston 104 is displaced in the direction Z1 from the two-dot-and-dash-line position to the solid-line position under the bias of the coil spring 118, pressing the brake member 106 against the brake disk 128 which is now gripped between the brake members 106, 122. The ball screw shaft 22 is locked against rotation, so that the piston 20 is stopped and remains accurately held in the position X2.

To displace the piston 20 from the position X2 to the position X1, the controller 32 supplies a signal to inactivate the solenoid-operated directional control valve 14 and a signal to actuate the solenoid-operated directional control valve 34 at a time t4. Compressed air is introduced into the space 108, bringing the brake member 106 away from the brake disk 128. The disk brake mechanism 36 is now inactivated. Since the first chamber 64a is vented to the atmosphere, i.e., the pressure in the first chamber 64a drops from the pressure P0 to a pressure P2, the piston 20 is displaced in the direction Z2 under the weight of the workpiece W.

When the controller 32 detects, at a time t5, the arrival of the piston 20 at a switching position that is spaced a distance e1 from the position X1 in which the piston 20 is to be stopped, the controller 32 supplies a signal to actuate the solenoid-operated directional control valve 14 and a signal to energize the electric motor 26. As a result, the pressure P0 is developed again in the first chamber 64a, supporting only a static load of the piston 20 and the workpiece W. Since the electric motor 26 is energized, however, the piston 20 is displaced in the direction Z2.

When the controller 32 detects, at a time t6, the arrival of the piston 20 at the position X1, the controller 32 transmits signals to de-energize both the electric motor 26 and the solenoid-operated directional control valve 34.

The compressed air in the space 108 is discharged into the atmosphere, and the brake disk 128 is gripped by the brake members 106, 122 under the bias of the coil spring 118, thus locking the ball screw shaft 22 against rotation, so that the piston 20 remains accurately held in the position X1.

Inasmuch as the servo cylinder apparatus 10 includes the normally closed solenoid-operated directional control valve 34 and the disk brake mechanism 36 for braking the piston rod 22 in the event of removal of the pneumatic pressure. Therefore, the workpiece W can be maintained in a safe position when the pneumatic pressure fails to be supplied due to a failure of the compressed air supply 12 or upon a power supply failure.

In the servo cylinder apparatus 10, the electropneumatic regulator 13 and the solenoid-operated directional control valves 14, 34 are mounted in the head cover 40. The solenoid-operated directional control valve 14 communicates with the first chamber 64a only through the passage 62, so that any change caused in the pneumatic pressure by the electropneumatic regulator 13 or the solenoid-operated directional control valve 14 can quickly be transmitted to the piston 20. Since the solenoid-operated directional control valve 34 is positioned closely to the disk brake mechanism 36 in the head cover 40, compressed air can quickly be supplied into and discharged from the space 108 by the solenoid-operated directional control valve 34, with the result that the piston 20 can accurately be stopped in a desired position.

Furthermore, since the ball screw shaft 22 and the drive shaft 28 of the electric motor 26 lie parallel to each other, and drive forces can be transmitted therebetween through the pulleys 74, 86 and the timing belt 24, the axial dimension of the servo cylinder apparatus 10 is relatively small. Except when the piston 20 is displaced in the direction Z2 with the first chamber 64a vented to the atmosphere (from the time t4 to the time t5), the pressure in the first chamber 64a is set to the pressure P0 for supporting the static load of the workpiece W and the piston 20 or higher. Consequently, the electric motor 26 can displace the piston 20 with relatively small drive forces. As a result, the electric motor 26 may be small in size, the distance between the pulleys 74, 86 may be reduced, the timing belt 24 may be shortened greatly, and errors due to elongation and contraction of the timing belt 24 and slippage between the timing belt 24 and the pulleys 74, 86 may be reduced. The drive forces of the electric motor 26 or the displacement of the piston 20 can thus be detected with high accuracy. Sprockets and a chain or a wire may be employed instead of the pulleys 74, 86 and the timing belt 24.

If the workpiece W is relatively light, then it may not drop by gravity in the direction Z2. To avoid such a drawback, the second chamber 64b of the cylinder chamber 64 and the compressed air supply 12 may be held in communication with each other by the passage 66 and a pressure-reducing valve 150 which is connected to the compressed air supply 12 as indicated by the broken lines in FIG. 1. With such a modified arrangement, when the solenoid-operated directional control valve 14 is inactivated to vent the first chamber 64a to the atmosphere, since a pneumatic pressure is exerted in the second chamber 64b through the pressure-reducing valve 150 and the passage 66 at all times, the piston 20 can be displaced in the direction Z2 based on the difference between the pneumatic pressures in the first and second chambers 64a, 64b.

In the above illustrated embodiment, the holding mechanism 52 holds the piston 20 and the table 46 against rotation with the guide rods 134a, 134b. However, the piston rod 18 may have splines and the rod cover 44 may have slots receiving the respective splines of the piston rod 18 for preventing the piston 20 and the table 46 from being rotated.

(2nd Embodiment)

Figure 7:
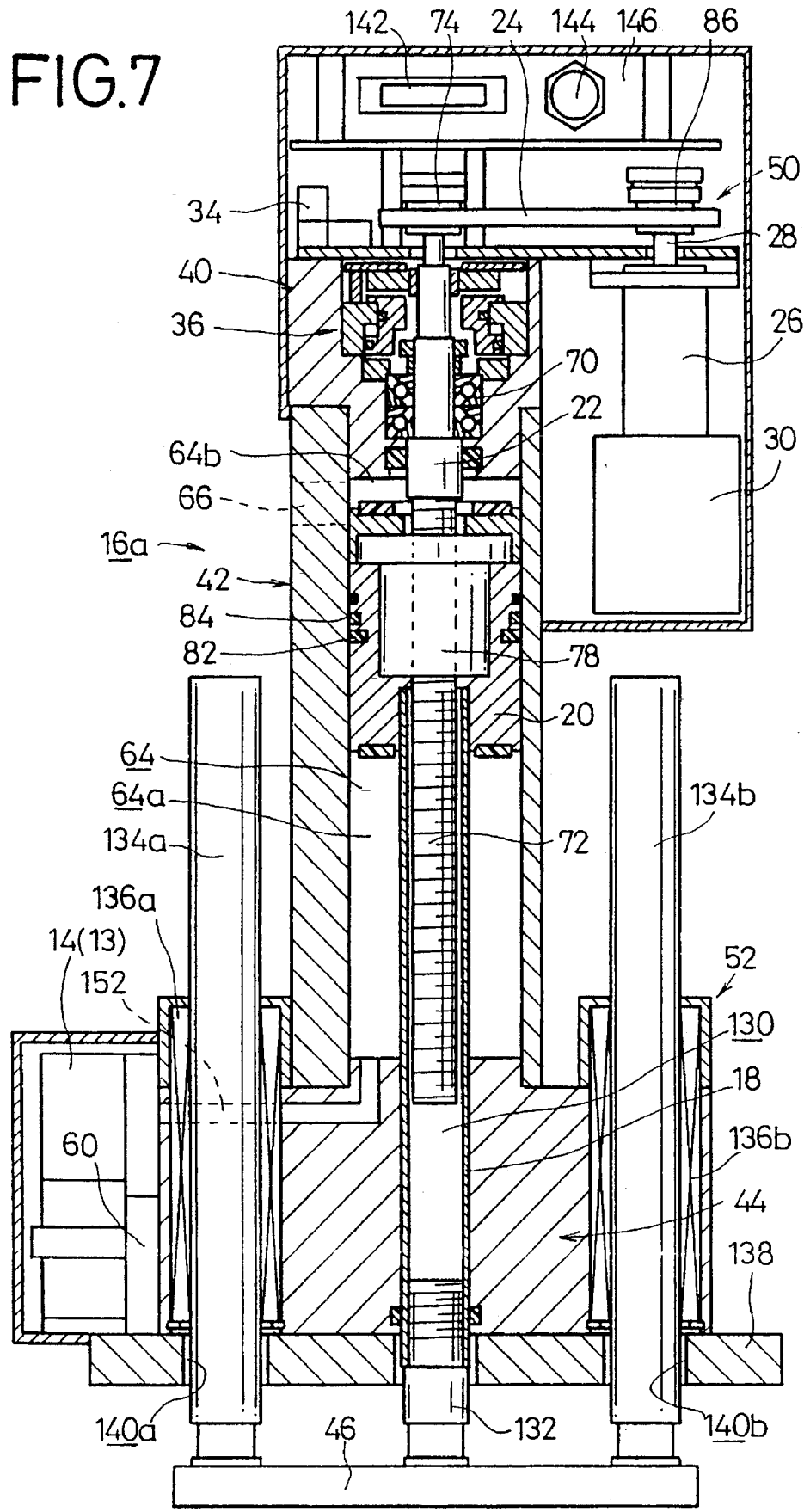
FIG. 7 is a partly cross-sectional view of the cylinder assembly of the servo cylinder apparatus according to a second embodiment of the present invention.

FIG. 7 shows a cylinder assembly 16a of a servo cylinder apparatus according to a second embodiment of the present invention. In the cylinder assembly 16a, the distance between a solenoid-operated directional control valve 14 and a first chamber 64a is further reduced. Those parts shown in FIG. 7 which are identical to those of the first embodiment are denoted by identical reference numerals, and will not be described in detail below.

An electropneumatic regulator 13 and a solenoid-operated directional control valve 14 are mounted on a rod cover 44, and the solenoid-operated directional control valve 14 communicates with a first chamber 64a through a passage 152. Therefore, no passage is required to be defined in a cylinder tube 42, and the distance between the solenoid-operated directional control valve 14 and the first chamber 64a is further reduced. Accordingly, the response speed of the piston 20 with respect to switching of the solenoid-operated directional control valve 14 is improved. The other structural details of the servo cylinder apparatus according to the second embodiment are identical to those of the servo cylinder apparatus according to the first embodiment.

(3rd Embodiment)

Figure 8:
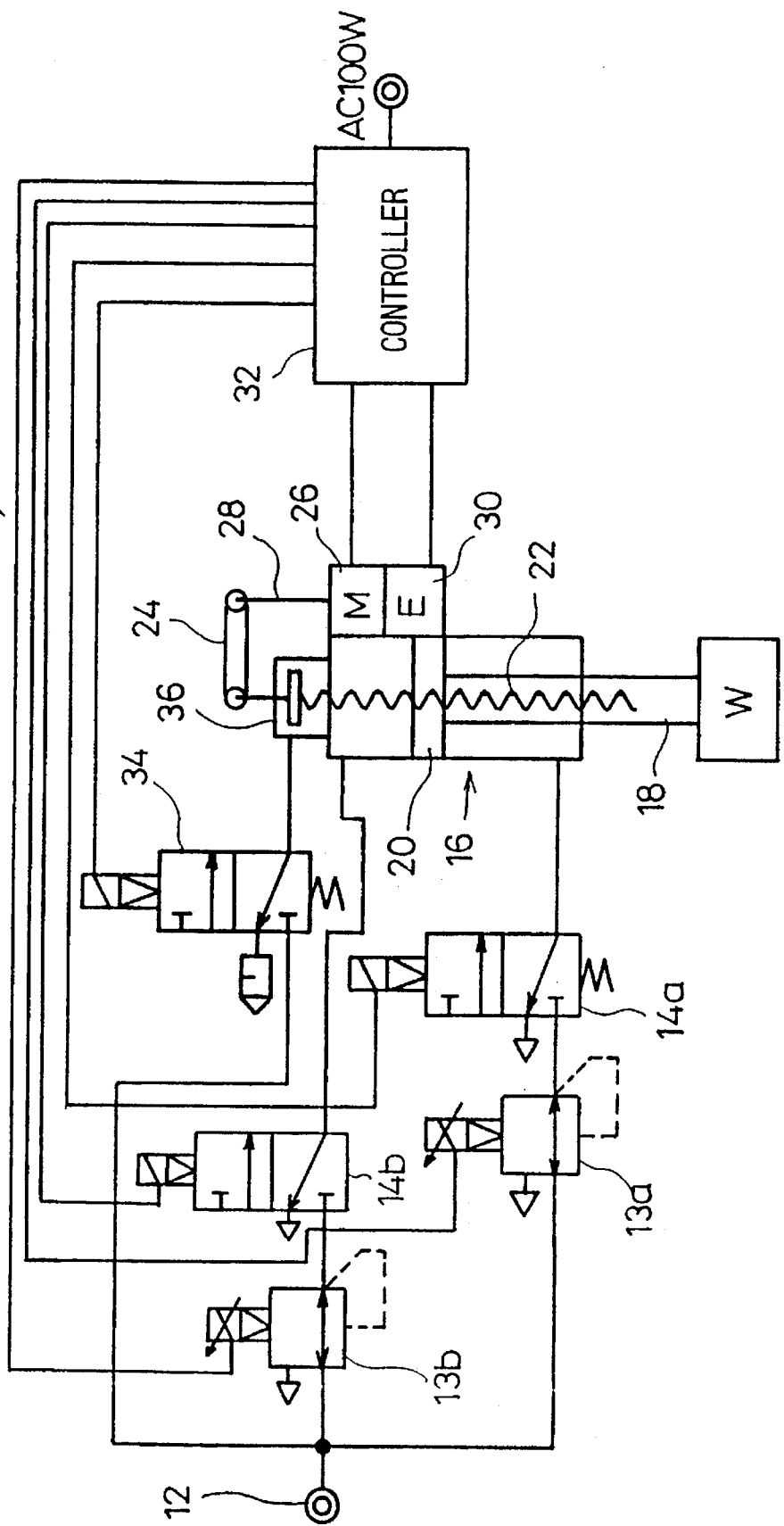
FIG. 8 is a circuit diagram of a fluid pressure circuit arrangement of a servo cylinder apparatus according to a third embodiment of the present invention.

FIG. 8 shows a fluid pressure circuit arrangement of a servo cylinder apparatus according to a third embodiment of the present invention. In the servo cylinder apparatus shown in FIG. 8, an electropneumatic regulator 13b and a solenoid-operated directional control valve 14b are added to replace the pressure-regulating valve 150 shown in FIG. 1. The servo cylinder apparatus shown in FIG. 8 also has an electropneumatic regulator 13a and a solenoid-operated directional control valve 14a which correspond respectively to the electropneumatic regulator 13 and the solenoid-operated directional control valve 14 in FIG. 1.

FIG. 9 shows a cylinder assembly of the servo cylinder apparatus according to the third embodiment. As shown in FIG. 9, the electropneumatic regulators 13a, 13b and the solenoid-operated directional control valves 14a, 14b are mounted in a head cover 40. The solenoid-operated directional control valve 14b communicates with a second chamber 64b through a passage 65, with no passage 66 (see FIG. 1) defined in a cylinder tube 42. The passage 65 has an effective cross-sectional area which is substantially the same as that of a passage 62 defined in the cylinder tube 42.

The other structural details shown in FIGS. 8 and 9 which are identical to those of the first embodiment are denoted by identical reference numerals, and will not be described in detail below.

The servo cylinder apparatus shown in FIGS. 8 and 9 operate in the same manner as the servo cylinder apparatus according to the first embodiment for displacing the piston 20 from the position X2 to the position X1 in FIGS. 10(a)–10(g).

To displace the piston 20 from the position X2 to the position X1, as shown in FIGS. 10(a)–10(g), the controller 32 supplies signals to actuate the solenoid-operated directional control valves 14b, 34 at a time t4 (see FIG. 6). Compressed air is introduced into the space 108, bringing the brake member 106 away from the brake disk 128. The disk brake mechanism 36 is now inactivated. The pressure in the second chamber 64b builds up to the pressure P1, displacing the piston 20 in the direction Z2.

When the controller 32 detects, at a time t5, the arrival of the piston 20 at a switching position that is spaced a distance ε1 from the position X1 in which the piston 20 is to be stopped, the controller 32 supplies a signal to inactivate the solenoid-operated directional control valve 14b and a signal to energize the electric motor 26. As a result, the pressure in the second chamber 64b decreases to the pressure P0. The piston 20 is displaced in the direction Z2 by the electric motor 26.

When the controller 32 detects, at a time t6, the arrival of the piston 20 at the position X1, the controller 32 transmits signals to de-energize both the electric motor 26 and the solenoid-operated directional control valve 34. The compressed air in the space 108 is discharged into the atmosphere, and the brake disk 128 is gripped by the brake members 106, 122 under the bias of the coil spring 118, thus locking the ball screw shaft 22 against rotation. The piston 20 is and remains accurately held in the position X1.

The servo cylinder apparatus according to the third embodiment is capable of displacing the piston 20 in the direction Z2 even when the workpiece W is light. Since the passages 62, 61, 65 communicating with the first and second chambers 64a, 64b open at a side of the head cover 40, the solenoid-operated directional control valves 14a, 14b may be mounted integrally on the head cover 40. Accordingly, any pipes extending from the solenoid-operated directional control valves 14a, 14b and the electropneumatic regulators 13a, 13b to the compressed air supply 12 may be reduced in length and simplified in structure.

The passages 62, 61, 65 are defined such that the effective cross-sectional area of the passages 61, 62 is equal to that of the passage 65. Therefore, pressure losses caused when air is supplied under pressure from the solenoid-operated directional control valves 14a, 14b to the first and second chambers 64a, 64b are substantially equal to each other, so that the speed at which the piston 20 is displaced can be controlled with ease.

Although certain preferred embodiments of the present invention has been shown and described in detail, it should be understood that various changes and modifications may be made therein without departing from the scope of the appended claims.

What is claimed is:

1. A servo cylinder apparatus comprising:

a piston displaceably disposed in a cylinder chamber defined in a cylinder assembly;

a piston rod having an end fixed to said piston and an opposite end exposed out of said cylinder chamber;

pressure supply means comprising a solenoid-operated directional control valve for supplying a fluid pressure to said cylinder chamber;

a ball screw shaft engaging said piston;

an electric motor coupled to said ball screw shaft;

a drive shaft coupled to said electric motor and extending parallel to said ball screw shaft;

first rotating means coupled to an end of said ball screw shaft and second rotating means coupled to said drive shaft, and rotation transmitting means connected between said first and second rotating means; and brake means for braking said ball screw shaft against rotation to thereby hold said piston in a predetermined position, said brake means comprising a brake mechanism for releasing said ball screw shaft in response to application of a fluid pressure thereto and braking said ball screw shaft in response to removal of a fluid pressure therefrom, said brake mechanism comprising a normally closed solenoid-operated directional control valve for connecting a fluid pressure supply to said brake mechanism to apply the fluid pressure thereto in response to an actuating signal and removing the fluid pressure from said brake mechanism in response to an inactivating signal;

wherein said piston is displaced closely to a target position under said fluid pressure supplied to said cylinder chamber, thereafter said ball screw shaft is rotated by said electric motor to inch said piston toward said target position, and when said piston reaches said target position, said ball screw shaft is braked against rotation by said brake means to stop said piston in said target position.

2. A servo cylinder apparatus according to claim 1, wherein said first and second rotating means comprise pulleys respectively, and said rotating transmitting means comprises a timing belt trained around said pulleys.

3. A servo cylinder apparatus according to claim 1, wherein said normally closed solenoid-operated directional control valve is mounted integrally on said cylinder assembly.

4. A servo cylinder apparatus according to claim 3, wherein said brake mechanism comprises a disk disposed around said ball screw shaft, a brake cylinder disposed around said ball screw shaft, a brake piston disposed around said ball screw shaft for being displaced in said brake cylinder under said fluid pressure supplied thereto, and a resilient member for normally biasing said brake piston to be pressed against said disk, the arrangement being such that said brake piston can be spaced from said disk against the bias of said resilient member when the fluid pressure is supplied from said normally closed solenoid-operated directional control valve to said brake cylinder.

5. A servo cylinder apparatus according to claim 1, wherein said solenoid-operated directional control valve supplies a fluid pressure to a rod-side chamber of said cylinder chamber, and further comprising a fluid passage interconnecting said rod-side chamber and said solenoid-operated directional control valve.

6. A servo cylinder apparatus according to claim 3, wherein said pressure supply means comprises a solenoid-operated directional control valve for supplying a fluid pressure to a head-side chamber of said cylinder chamber remote from said piston rod, and a fluid passage interconnecting said head-side chamber and said solenoid-operated directional control valve.

7. A servo cylinder apparatus according to claim 3, wherein said pressure supply means comprises a first solenoid-operated directional control valve for supplying a fluid pressure to a rod-side chamber of said cylinder chamber, a first fluid passage interconnecting said rod-side chamber and said first solenoid-operated directional control valve, a second solenoid-operated directional control valve for supplying a fluid pressure to a head-side chamber of said cylinder chamber remote from said rod-side chamber, and a second fluid passage interconnecting said head-side chamber and said second solenoid-operated directional control valve, said first and second solenoid-operated directional control valves being mounted integrally in substantially the same position on said cylinder assembly.

8. A servo cylinder apparatus according to claim 7, wherein said first and second fluid passages have substantially the same effective cross-sectional area.

9. A servo cylinder apparatus according to claim 1, wherein said cylinder assembly has a rod cover disposed outside of a rod-side chamber of said cylinder chamber and a head cover disposed outside of a head-side chamber of said cylinder chamber remote from said rod-side chamber, said pressure supply means being integrally mounted in said rod cover or said head cover.

10. A servo cylinder apparatus according to claim 5, wherein said cylinder assembly has a rod cover disposed outside of said rod-side chamber, said solenoid-operated directional control valve for supplying a fluid pressure to said rod-side chamber being integrally mounted in said rod cover.

11. A servo cylinder apparatus according to claim 6, wherein said cylinder assembly has a head cover disposed outside of said head-side chamber, said solenoid-operated directional control valve for supplying a fluid pressure to said head-side chamber being integrally mounted in said head cover.

12. A servo cylinder apparatus according to claim 7, wherein said cylinder assembly has a head cover disposed outside of said head-side chamber and a rod cover disposed outside of said rod-side chamber, said brake means and said second solenoid-operated directional control valve being disposed in said head cover, said first solenoid-operated directional control valve being disposed in said rod cover.

* * * * *